UNITED STATES PATENT OFFICE.

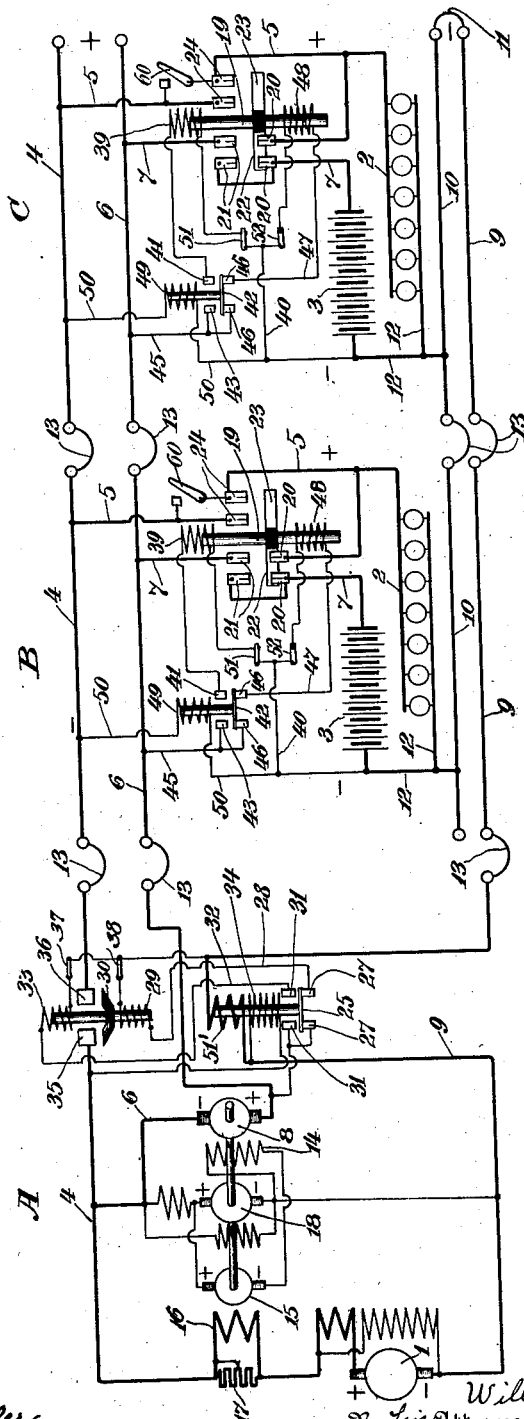

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

991,111.     Specification of Letters Patent.     Patented May 2, 1911.

Application filed February 24, 1909. Serial No. 479,755.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and is more especially designed with respect to electrical train lighting systems in which a plurality of feeding conductors extend through the various train units to properly feed the translating devices thereon. In such systems it is customary to provide one generator and a separate storage battery and lighting or work circuit on each one of the various train units. The purpose of the battery is to provide a source of electrical energy for feeding the lamps or other translating devices when the generator is shut down. In order to accomplish this it is customary to provide a switch for automatically connecting the battery directly across the work circuit when the generator is inoperative. In previous systems of this class, and in which separate charging and feeding conductors extend throughout the train for the batteries and work circuits, however, it has been customary to leave either the battery or work circuit directly connected across the positive and negative conductors which extend throughout the train so that although the generator may be shut down and entirely disconnected, yet, nevertheless there remains extending throughout the train various conductors which are fully energized from the battery or batteries. If the cars or train units are in the yards for repairs or other purposes these live conductors may form a source of danger or may be tampered with in such a way as to injure or deleteriously affect the electrical apparatus on the various units. In order to avoid these dangers I propose to provide various arrangements and connections whereby the various conductors extending throughout the various train units are rendered dead when the main generator is not in operation. More specifically I provide switching arrangements which automatically act to disconnect each battery from all of the train conductors which are of one polarity. This renders it substantially impossible for any one to receive injury therefrom or for the apparatus to become injured by tampering with the various train conductors.

My invention also comprehends the provision of a system which is economical and efficient in operation and construction and which has many minor advantages.

Further objects, features and advantages will more clearly appear from the detailed description given below taken in connection with the accompanying drawing which diagrammatically shows a train lighting system embodying one form of my invention.

In the drawing, A, B and C represent three train units, of which the unit A may be the locomotive or baggage car upon which the main generator 1 is situated. The units B and C represent cars or coaches carrying the lighting or work circuits 2, 2. Each car is also provided with a storage battery 3, 3. Extending throughout the various train units is a feeding conductor 4 which connects the positive side of the generator 1 with the various circuits 2, by means of connectors 5, 5. Also extending throughout the various train units is a conductor 6 which connects the positive side of the generator 1 with the various batteries by means of connectors 7. The conductor 6, therefore, acts as a charging conductor for the purpose of conveying the charging current to the batteries 3, 3. In order to increase the potential of the charging conductor 6 in order to provide the proper voltage for charging the various batteries I provide a booster 8 in series with the conductor 6, also extending throughout the various train units is a conductor 9 which connects with the negative terminal of the generator 1. Extending through the train units B and C is conductor 10 which is connected with the conductor 9 by a loop 11, so that the conductors 9 and 10 form a return conductor for the various batteries and work circuits, the batteries and work circuits of each car being connected to the conductor 10 by connectors 12. The various train conductors 4, 6, 9 and 10 are connected together between the various train units by connectors 13.

The booster 8 is provided with a controlling field coil 14 energized by a counter-electromotive force exciter 15 which is controlled in the usual manner by a field coil 16 connected in shunt to the resistance 17 in the feeding conductor 4 which supplies the various work circuits on the train units. The exciter 15 and booster 8 are driven by a motor 18 in the usual manner.

Each of the units B and C is provided with an electro-responsive switch 19 which in its lower position connects the battery 3 directly across the work circuit 2 by electrically connecting the terminals 20. When the switch 19 is in its uppermost position the connection between the terminals 20 is broken and said switch makes electrical connection between the contact terminals 21, 21, so that the battery is connected directly to the charging conductor 6. These connections are made by a blade 22 carried by the movable parts of the switch 19 and when the blade 22 is in its lowermost position the connection between the terminals 21 is broken so that the battery is disconnected from the charging circuit 6. Each switch 19 is also provided with a blade 23 which when in its uppermost position electrically connects contact terminals 24 to connect the various work circuits directly with the feeding conductor 4. It will thus be seen that when each of the switches 19 are in their lowermost position the battery 3 is connected directly and only to the work circuit 2 and is entirely disconnected from both the positive feeding and charging conductors 4 and 7. When the switch is in its uppermost position the battery 3 is connected directly to the charging conductor while the work circuit 2 is connected directly to the feeding conductor 4, so that the battery may be charged and the work circuit fed at independent voltages.

25 represents a switch arranged to connect the terminals 27, 27 so as to complete a circuit 28 which includes a magnet coil 29 operating upon a switch 30 when the switch 25 is in its lowermost position. When the switch 25 is in its uppermost position it connects terminals 31, 31, which completes a circuit 32 in series with the magnet coil 33 which also operates upon the switch 30 but in the opposite direction from the magnet coil 29. The switch 25 is maintained in its lowermost position by gravity and is arranged to be drawn upward by means of the magnet coil 34 connected across the conductors 4 and 9 so as to be responsive to the voltage of the main generator 1. Thus when the switch 25 is lowered the coil 29 is energized, being connected between the conductors 9 and 6, and when the switch 25 is raised under the action of coil 34 the coil 33 is energized, being also connected across the conductors 9 and 6. Upon the energization of coil 33 the switch 30 is raised, thus making electrical connection between the contact terminals 35 and 36 so as to connect that portion of the feeding conductor 4 upon the unit A with that portion of the feeding conductor 4 on the various other train units. When the switch 25 is in its lowermost position the coil 33 is deënergized and the coil 29 is energized so that the switch 30 is pulled down, thus opening the circuit through the conductor 4 so that it is no longer fed by the generator 1.

The switches 19 on the units B and C are arranged to be drawn upward in order to connect the batteries with the charging conductor 7 and the work circuits with the feeding conductor 4 by means of magnet coils 39, one terminal of which is connected to the negative conductors 12 by means of wires 40 and the other terminal of which is connected to a contact 41.

42, 42 represents switches arranged to connect the terminal 41 with a contact terminal 43 when these switches are in their uppermost position, so that the magnet coil 39 will be connected between negative conductor 9 and the positive conductor 6 by means of wires 45. When the switches 42 are in their lowermost position they connect contact terminals 46 to complete a circuit 47 through a magnet coil 48, so that the magnet coil 48 is connected between the positive conductor 6 and the negative conductor 10. The magnet coils 39 and 48 act in opposite directions upon the switches 19, the coils 39 operating to raise the switches and the coils 48 operating to drop the switches. The switches 42 are controlled by means of magnet coils 49 which are connected between the positive conductor 4 and the negative conductor 10 by a circuit 50.

51 and 52 are switches which are in series with the coils 39 and 48 respectively.

The system as represented shows the various parts in the position they would keep when the main generator 1 is shut down or is practically inoperative. When the generator 1 is started up and produces a predetermined voltage the coil 34 acts upon the switch 25 to attract the same, thereby connecting contact terminals 31 and energizing the magnet coil 33 of switch 30. This causes the switch 30 to be attracted upwardly to connect the contact terminals 35 and 36 so that the circuit through the train conductor 4 is completed and extends through the various units B and C and becomes energized. Immediately there exists this difference of potential between the train conductors 4 and 10 the coils 49 become energized so that the switches 42 are attracted upwardly to connect the contact terminals 41 and 43, thus completing the circuit through the magnet coils 39 to energize the same. This causes the switches 19 to be drawn upwardly to connect the contact terminals 21, 21 together and the contact terminals 24, 24 together, so that the battery will become directly connected to the charging conductor 6 and the work circuit will become directly connected to the feeding conductor 4. The parts remain in this position as long as the generator furnishes the proper voltage to supply the system.

When the generator voltage decreases upon its being shut down the coil 34 of switch 25 is weakened, or if the batteries have a sufficient voltage a reverse current is sent through the coil 51' which is connected in series in the conductor 9. This energization of the coil 51' further decreases the attraction of the switch 25 so that it is effectively released and connection is made between the contact terminals 27, 27. This energizes magnet coil 29 of switch 30 so that it is attracted downwardly and the circuit through conductor 4 opened so that the train conductor 4 upon the various units becomes opened. This action deënergizes the various voltage coils 49, 49, which operate the switches 42 so that these switches are dropped to their lowermost position, thereby opening the circuit 39, 39 and closing the circuit through the magnet coils 48, 48 of the main switches 19 so that the switches 19 are attracted to their lowermost positions in which the blades 22 thereof connect the terminals 20 so that the batteries 3 are connected to the work circuit 2 and are wholly and entirely disconnected from both the positive conductors, namely, the charging conductor 6 and the feeding conductor 4.

The small hand switches 60 which I have shown as bridging the contacts 24, 24, may be closed, so that if desirable, all the batteries may be charged in parallel in the yards when the unit on which the generator is placed is disconnected, in which case a separate source of electromotive force would be applied to the conductors 4 and 10. Also upon failure of the generator in service the batteries may be thus connected to jointly supply the load with the generator.

From the above it will be apparent that upon a certain decrease in voltage of the generator 1 or when the generator 1 is shut down the various switches are brought into action to disconnect the various batteries from all of the train conductors of one potential so that all of the various train conductors extending through the various units are rendered dead and deënergized. It will further be apparent that the various objects and advantages are accomplished in a simple and effective manner and constitute an important improvement in the way of safeguarding not only the electrical apparatus on the various train units but also in preventing injury to persons who may occasionally or otherwise come into contact with the various train conductors when the same are not in operation.

Although I have described my improvements with relation to a specific system of electrical distribution and have shown and described them in great detail, yet I do not desire to be limited to such details but Having fully and clearly explained my invention what I claim as new and desire to secure by Letters Patent, is:

1. In a train lighting system, a generator on one train unit, a plurality of batteries and work circuits on other train units, a feeding conductor for the various work circuits extending through the various train units, a charging conductor for the batteries extending through the various train units, a common return conductor for the batteries and work circuits, and means responsive to a decrease in the generator voltage for rendering said batteries disconnected from various of said conductors to render all of said conductors dead.

2. In a train lighting system, a generator on one train unit, a plurality of batteries and work circuits on other train units, a feeding conductor for the various work circuits extending through the various train units, a charging conductor for the batteries extending through the various train units, a common return conductor for the batteries and work circuits, and means for disconnecting the batteries from all the conductors which are normally connected to one side of the generator responsive to a decrease in the voltage of the generator.

3. In an electrical system of distribution, a source of electromotive force, a battery and work circuit arranged to be fed thereby, conductors for connecting the battery and work circuit with said source, a switch member in series with the work circuit for opening the conductor leading to the work circuit from the source, a switch member in series with the battery for opening the conductor leading to the battery, and means for actuating said members responsive to variations in the electrical condition of the system.

4. In an electrical system of distribution, a source of electromotive force, a plurality of batteries and work circuits arranged to be fed thereby, conductors for connecting the batteries and work circuits with said source, a switch member in series with each work circuit for opening the conductor leading to each work circuit from the source, a switch member in series with each battery for opening the conductor leading to each battery, and means for actuating said members responsive to variations in the electrical condition of the system.

5. In combination, a plurality of work circuits, a plurality of batteries therefor, a common feeding conductor for the work circuits, a common charging conductor for the batteries, a common return conductor, and a switch apparatus for automatically and wholly disconnecting each of the batteries and work circuits from said charging and feeding conductors responsive to a drop in voltage across the feeding and return conductors and for connecting each work circuit with its battery.

6. In an electrical system of distribution, a plurality of units, a generator on one unit, a storage battery and work circuit on each of the other units, a feeding conductor extending through the various units and connected to the various work circuits, a charging conductor extending through the various units and connected to the various batteries to charge the same, a common return conductor extending through the various train units and connected to the various batteries and work circuits and means for independently disconnecting the batteries and work circuits on each unit from all of said conductors of one polarity responsive to a decrease in generator voltage.

7. In an electrical system of distribution, a plurality of train units, a generator on the train, a storage battery and work circuit on each of the units, a feeding train conductor extending from the generator through the various train units and feeding the various work circuits, a charging train conductor extending through the various train units and connected to the batteries for charging the same, a return train conductor for the batteries and work circuits extending through the various train units, switches on each unit for disconnecting the battery and work circuit thereon from all of said conductors of one polarity and means for controlling said switches responsive to a decrease in the generator voltage.

8. In an electrical system of distribution, a plurality of train units, a generator on the train, a storage battery and work circuit on each of the units, a feeding train conductor extending from the generator through the various train units and feeding the various work circuits, a charging train conductor extending through the various train units and connected to the batteries for charging the same, a return train conductor for the batteries and work circuits extending through the various train units, and means for disconnecting the battery and work circuit on each unit from said feeding and charging conductors responsive to a change in the electrical condition of the system.

9. In an electrical system of distribution, a plurality of train units, a generator on the train, a storage battery and work circuit on each of the units, a feeding train conductor extending from the generator through the various train units and feeding the various work circuits, a charging train conductor extending through the various train units and connected to the batteries for charging the same, a return train conductor for the batteries and work circuits extending through the various train units, and switches for disconnecting the battery and work circuit on each unit from said feeding and charging conductors responsive to a decrease in the generator voltage.

10. In an electrical system of distribution, a plurality of train units, a generator on the train, a storage battery and work circuit on each of the units, a feeding train conductor extending from the generator through the various train units and feeding the various work circuits, a charging train conductor extending through the various train units and connected to the batteries for charging the same, a return train conductor for the batteries and work circuits extending through the various train units, a switch on various units for disconnecting the batteries and work circuits thereon from said charging and feeding conductors and a solenoid on said units for controlling the action of said switches responsive to the electrical condition of the generator.

11. In an electrical system of distribution, a plurality of train units, a storage battery and work circuit on each of the units, a generator, a feeding train conductor extending from the generator through the various train units and feeding the various work circuits, a charging train conductor extending through the various train units and connected to the batteries for charging the same, a return train conductor for the batteries and work circuits extending through the various train units, a switch on each unit with the batteries and work circuits for wholly disconnecting the battery thereon from the charging and feeding conductors and a coil responsive to generator voltage for controlling the action of said switches.

12. In an electrical system of distribution, a plurality of train units, a storage battery and work circuit on each of the units, a generator, a feeding train conductor extending from the generator through the various train units and feeding the various work circuits, a charging train conductor extending through the various train units and connected to the batteries for charging the same, a return train conductor for the batteries and work circuits extending through the various train units, a switch for opening one of said conductors between the generator and one of the work circuits and batteries, switches on various units for wholly disconnecting the batteries thereon from said feeding and charging conductors and a coil responsive to the action of said first mentioned switch for controlling the action of said last mentioned switches responsive thereto.

13. In an electrical system of distribution, a plurality of train units, a storage battery and work circuit on each of the units, a generator, a feeding train conductor extending from the generator through the various train units and feeding the various work circuits, a charging train conductor extending through the various train units and connected to the batteries for charging the same, a return train conductor for the batteries and work circuits extending through the various train units, a switch for opening said feeding conductor responsive to voltage variations of the generator, a coil on various of the units connected to be responsive to the voltage between the feeding conductor and the return conductor, and switches on various of the train units for disconnecting the batteries and work circuits from said feeding and charging conductors, said switches being controlled by said coils.

14. In a system of electrical distribution, a generator, a plurality of train units each carrying a work circuit and a storage battery, a feeding conductor extending through the various train units for connecting the work circuits with the generator, a charging conductor extending through the various train units for charging the batteries, a booster in said circuit, a common return conductor extending through the various train units to the generator, a switch for opening the feeding circuit to disconnect the generator from the work circuits, a switch for controlling the action of said last mentioned switch responsive to the generator voltage and the generator current and means for rendering the various conductors on the train units dead responsive to the opening of said first mentioned switch.

15. In a system of electrical distribution, a generator, a plurality of train units each carrying a work circuit and a storage battery, a feeding conductor extending through the various train units for connecting the work circuits with the generator, a charging conductor extending through the various train units for charging the batteries, a booster in said circuit, a common return conductor extending through the various train units to the generator, a switch for opening the feeding circuit to disconnect the generator from the work circuits, a switch for controlling the action of said last mentioned switch responsive to the generator voltage and the generator current and means for rendering the various conductors on the train units dead responsive to the opening of said first mentioned switch, said means including switches on each car for disconnecting the battery and work circuit thereon from the feeding and charging conductors.

16. In an electrical system of distribution, a plurality of train units, a generator, a storage battery and work circuit on each of the units, a feeding train conductor extending from the generator through the various train units and feeding the various work circuits, a charging train conductor extending through the various train units and connected to the batteries for charging the same, a return train conductor for the batteries and work circuits extending through the various train units, and means for rendering said conductors dead responsive to a shut down of the generator.

17. In combination, a work circuit, a battery, a feeding conductor for the work circuit, a charging conductor for the battery, a common return conductor and a switch apparatus for automatically and wholly disconnecting the battery and work circuit from said charging and feeding conductors responsive to a drop in voltage across the feeding and return conductors, said switch apparatus being provided with two coils, each operating upon it to cause it to move in the opposite direction from that in which the other coil causes it to move.

18. In an electrical system of distribution, a plurality of train units, a battery and work circuit on each unit, a source of electrical energy, a plurality of conductors leading from said source through said units for feeding the batteries and work circuits, means for disconnecting the source from said conductors responsive to a change in the electrical condition of the system and means for disconnecting each battery from all of said conductors of one polarity to render all of said conductors dead, responsive to a change in the electrical condition of the system.

In testimony whereof, I have signed my name to this specification, in the presence of two subscribing witnesses.

WILLIAM A. TURBAYNE.

Witnesses:
  Thos. Dobbins,
  W. H. Pattenden.